(12) United States Patent
Kurata

(10) Patent No.: US 7,699,385 B2
(45) Date of Patent: Apr. 20, 2010

(54) VEHICLE BODY STRUCTURE

(75) Inventor: Hidetoshi Kurata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 69 days.

(21) Appl. No.: 12/163,220

(22) Filed: Jun. 27, 2008

(65) Prior Publication Data

US 2009/0001766 A1    Jan. 1, 2009

(30) Foreign Application Priority Data

Jun. 28, 2007    (JP) .............................. 2007-170972

(51) Int. Cl.
*B62D 25/08* (2006.01)

(52) U.S. Cl. ................ 296/204; 296/187.08; 296/187.1

(58) Field of Classification Search ................. 296/204, 296/203.02, 203.01, 187.03, 187.08, 187.09, 296/187.1, 187.12

See application file for complete search history.

(56) References Cited

U.S. PATENT DOCUMENTS 6,679,546 B2 *    1/2004    Mishima et al. ........ 296/203.01
7,458,611 B2 *    12/2008    Hashimura .................. 280/830
2005/0082879 A1 *    4/2005    Goto et al. .................. 296/204
2009/0001761 A1 *    1/2009    Yasuhara et al. ....... 296/193.07

FOREIGN PATENT DOCUMENTS

JP    2002-302071    10/2002

\* cited by examiner

*Primary Examiner*—Dennis H Pedder
(74) *Attorney, Agent, or Firm*—Rankin, Hill & Clark LLP

(57) ABSTRACT

Provided is an automotive vehicle body structure which is light weight but demonstrates an improved mechanical strength during a frontal collision. A pair of front side frames extend in a fore-and-aft direction in a mutually spaced relationship in a front part of a vehicle body, and a pair of floor frames having forward ends joined to rear ends of the corresponding front side frames, respectively, extend in the fore-and-aft direction. A front cross member is provided with a pair of lateral ends that are joined to inboard sides of the rear end portions of the corresponding front side frames, and is arch shaped. A middle cross member is placed behind the front cross member and extends across the floor frames. Tunnel frames extend in a fore-and-aft direction in a central part of the vehicle body to join a dashboard lower panel, front cross member and middle cross member.

11 Claims, 5 Drawing Sheets

VEHICLE BODY STRUCTURE

TECHNICAL FIELD

The present invention relates to an automotive vehicle body structure which is light in weight but demonstrates an improved mechanical strength at the time of a frontal collision.

BACKGROUND OF THE INVENTION

A monocoque vehicle body is typically fabricated by preparing a number of panel members and frame members by stamp forming steel sheet metal and joining them together by spot welding (see Japanese patent laid open publication No. 2002-302071). In a conventional vehicle body, the impact created by a frontal collision of the vehicle with another vehicle or a fixed structure is transmitted from the bumper to a pair of side front side frames extending in the fore-and-aft direction in a laterally spaced apart relationship. A part of the impact is then transmitted to side sill inners via corresponding outriggers while most of the impact is transmitted to a middle cross member via a right and left floor frame.

In the vehicle body structure disclosed in the aforementioned patent publication, a central part of the floor panel bulges upward to accommodate a fuel tank under it, and the fuel tank is received in a space defined by a front cross member, the middle cross member and floor frames. To the upper surface of the floor panel are attached the front and rear legs of seat frames that support the front seats.

In such a vehicle body structure, because the impact load transmitted by the front side frames is in most part applied to the floor frames, the floor frames are required to have large cross sectional areas and/or made of relatively thick steel sheets so that they add a significant weight to the overall weight of the vehicle body. An increased vehicle weight is obviously not desirable as it adversely affects the fuel economy and driving performance of the vehicle. It has therefore been desired to more effectively distribute the impact load transmitted to the front side frames to frame members other than the floor frames.

Also, in this vehicle body structure, when a side impact is applied to a front part of the vehicle body, the impact load applied from the corresponding side sill inner is transmitted to the front cross member. Therefore, if the fuel tank is located under the floor panel, the front cross member is required to be reinforced by using thicker steel sheets, and this also contributes to the increase in the weight of the vehicle body.

Furthermore, at the time of a frontal impact, the vehicle occupant is thrown forward under an inertia force while restrained by a seat belt. As a result, the front part of the vehicle seat receives a significant downward force, and this may cause a downward deflection of the floor panel to which the front legs of the seat frames are attached. Such a downward deflection of the floor panel must be controlled because the head of the vehicle occupant may be brought too close to the dashboard panel. This necessitates a floor panel having a relative large section modulus and using a relatively thick steel sheet. This again added to the increase in the weight of the vehicle body, and makes the stamping work more difficult.

BRIEF SUMMARY OF THE INVENTION

In view of such problems of the prior art, a primary object of the present invention is to provide an improved automotive vehicle body structure which is light in weight but demonstrates an improved mechanical strength at the time of a frontal collision.

According to the present invention, such an object can be accomplished by providing a vehicle body structure, comprising: a pair of front side frames extending in a fore-and-aft direction in a mutually spaced relationship in a front part of a vehicle body; a pair of floor frames having forward ends joined to rear ends of the corresponding front side frames, respectively, and extending in the fore-and-aft direction; a first cross member joined to rear ends of the front side frames at either lateral end thereof; a second cross member placed behind the first cross member and joined to the floor frames; and a first tunnel frame connected to the first and second cross members; wherein the first cross member is provided with an arch shape such that a fore-and-aft dimension of the first cross member diminishes from each side end thereof toward a middle part thereof.

Thereby, the impact load received from the front side frames is transmitted not only to the floor frames that are directly connected to the rear ends of the front side frames but also to the first tunnel frame via the first cross member in an effective manner. Therefore, the floor frames may consist of a relatively thin sheet metal and/or require less material, and may be given with a reduced weight. The first cross member also resists deformation of the vehicle body in the lateral direction so that the safety of the vehicle occupants at the time of a side impact can be improved.

Preferably, the vehicle body structure further comprises a floor panel defining a floor of a vehicle cabin; a pair of side sills joined to either side edge of the floor panel; and a pair of outriggers each extending laterally between the corresponding front side frame and the front end of the side sill on the corresponding side. Thereby, the impact load at the time of a frontal crash can be effectively distributed to the side sills as well. This also enhances the rigidity of the vehicle body against an oblique crash in which the impact load is relatively concentrated on one of the front side frames. In particular, each outrigger may be provided with a rearwardly swept back front edge that extends from the corresponding front side frame to the front end of the corresponding side sill.

According to a preferred embodiment of the present invention, the vehicle body further comprises a dashboard lower panel disposed in front of the first cross member to separate a vehicle cabin from an engine room; and a second tunnel frame extending in a fore-and-aft direction in a laterally middle part of the vehicle body to connect the dashboard lower panel with the first cross member. Thereby, even when the engine is pushed into the vehicle cabin in a severe frontal crash, the impact load carried by the engine can be supported by the second tunnel frame, and this minimizes the damage to the dashboard lower panel. In particular, if at least one of the first and second tunnel frames is provided with a channel shaped cross section with an open side facing downward, the tunnel frame or tunnel frames are enabled to effectively withstand a buckling load.

According to a particularly preferred embodiment of the present invention, the first cross member is provided with a channel shaped cross section with an open side facing upward so as to include a bottom wall and a pair of upright walls, and a stiffener extends vertically and in a fore-and-aft direction between the two vertical walls. This effectively prevents the first cross member from collapsing or otherwise deforming under an impact load. It is particularly preferable if the second tunnel frame is also provided with a channel shaped cross section that includes a pair of upright walls, an open side of the second tunnel frame facing downward, and the stiffener is disposed adjacent to one of the vertical walls of the second tunnel frame.

The vehicle body structure may further comprise a seat frame having a front end attached to the first cross member. In this case, at the time of a frontal crash, because the front legs of the seat frames are attached to the first cross member, the deformation of the seat frame owing to the downward force applied to the seat frame by the inertia force acting on the vehicle occupant in the seat is minimized, and the vehicle occupant is prevented from coming undesirably close to the dashboard.

According to another aspect of the present invention, a fuel tank is received in a rectangular space defined by the first and second cross members and floor frames so that the safety of the fuel tank against impact situations can be improved.

Also, the front side frames may be provided with oblique inboard edges which are progressively closer to each other toward rear ends thereof, and a front edge of the first cross member may define a concave shape that smoothly connects the oblique inboard edges of the front side frames. According to a particularly preferred embodiment of the present invention, the first cross member is provided with a substantially straight rear edge.

The floor panel may comprise a front part and a rear part that are joined to each at the first cross member so that the thickness and/or material (using high-tension steel as opposed to normal steel) of the front part may be made different from those of the rear part so that the stamp forming efficiency or other fabrication efficiency may be improved.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
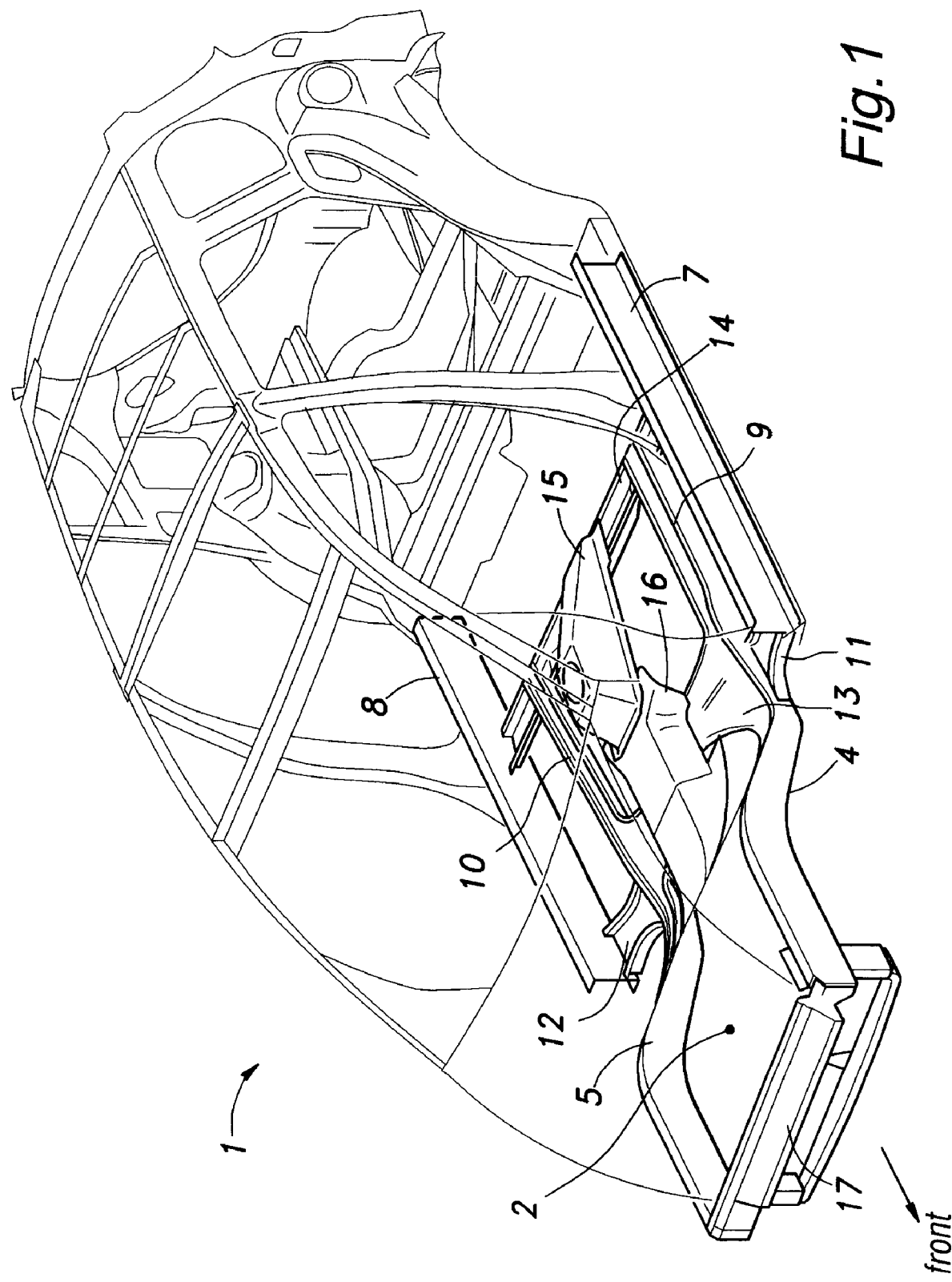
FIG. 1 is a perspective see-through view of a vehicle body structure embodying the present invention.
Figure 2:
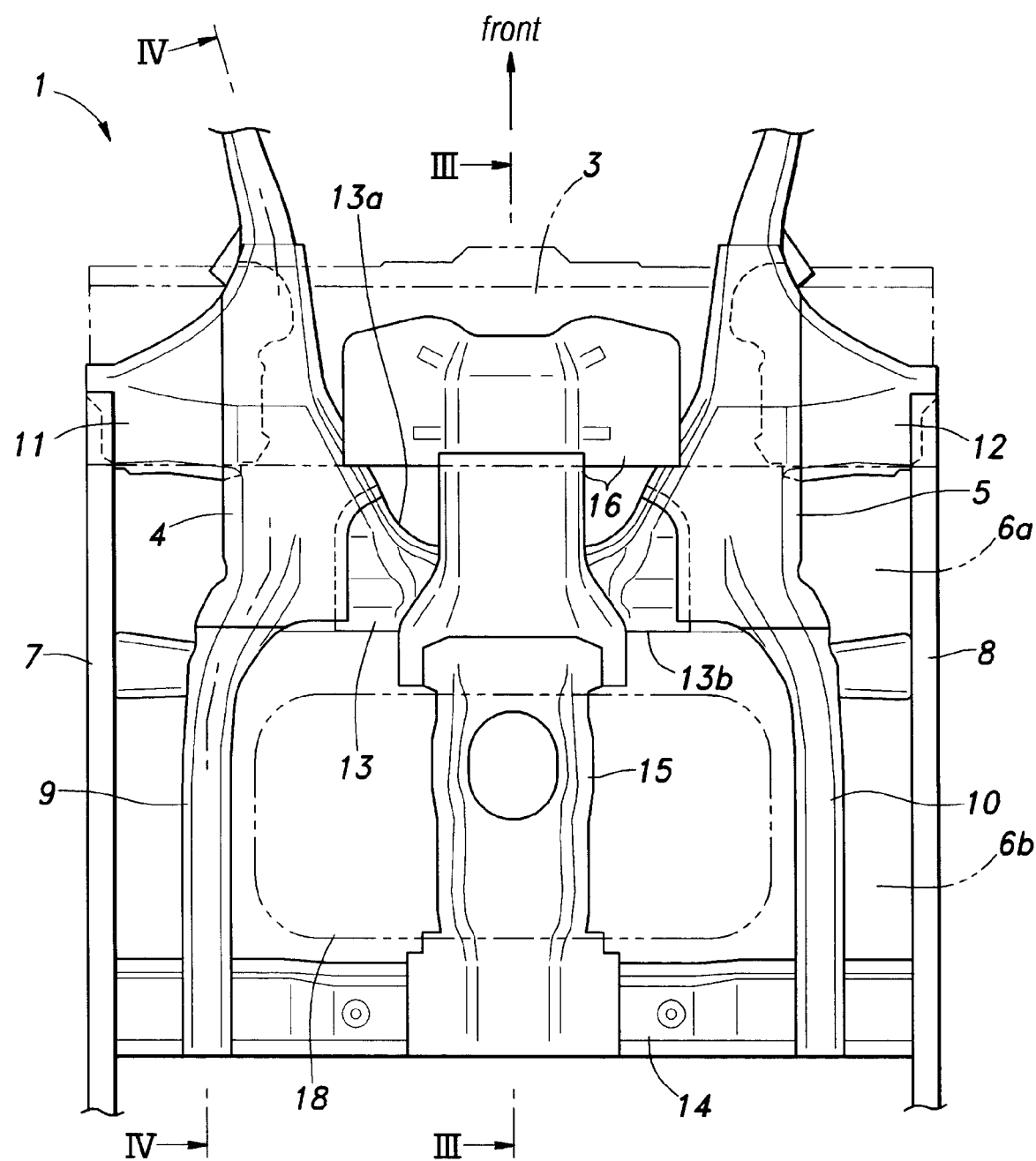
FIG. 2 is a plan view of the vehicle body structure according to the present invention.
Figure 3:
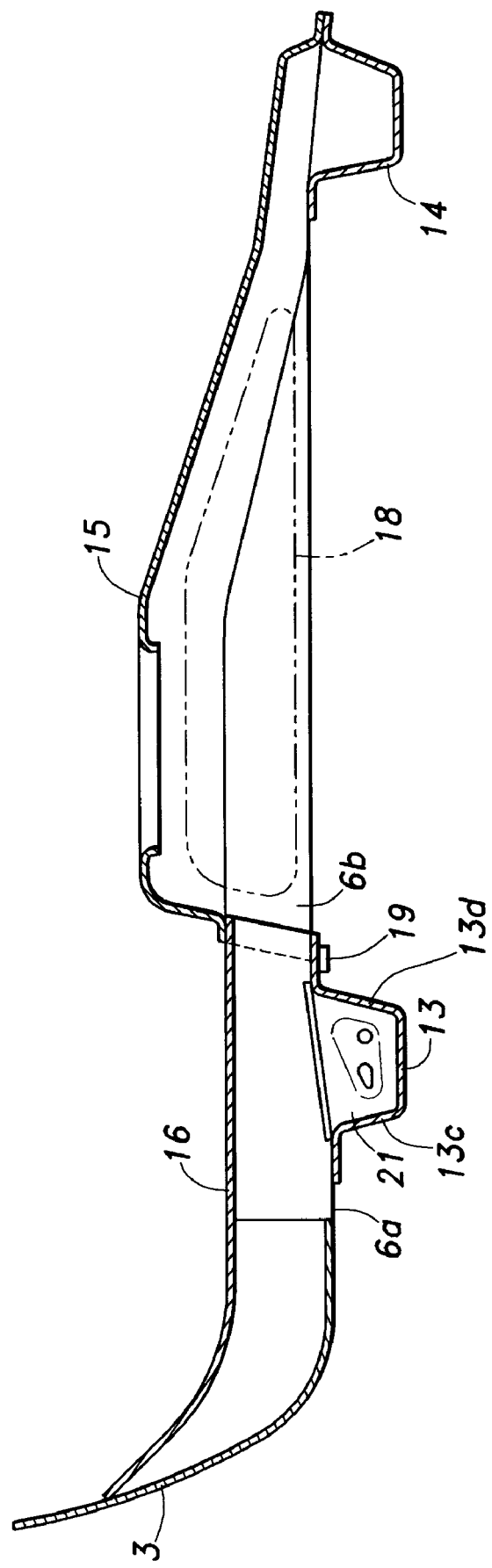
FIG. 3 is a sectional view taken along line III-III of FIG. 2.

The embodiment illustrated in FIGS. 1 to 3 is directed to a hatch back passenger vehicle. The vehicle body 1 comprises various body panels including dashboard lower panel 3 defining a front end portion of a cabin and a front and rear floor panel 6a and 6b forming the floor of the cabin, and various frame members including a right and left front side frame 4 and 5, a right and left side sill inner (side sill) 7 and 8, a right and left floor frame 9 and 10, a right and left outrigger 11 and 12, a front cross member (first cross member) 13, a middle cross member (second cross member) 14, a floor tunnel frame (first tunnel frame) 15 and a dashboard lower tunnel frame (second tunnel frame) 16. Numeral 17 in FIG. 1 denotes a bumper beam attached to the front ends of the front side frames 4 and 5. Numeral 18 in FIG. 2 denotes a fuel tank placed centrally under the vehicle body 1, and is received in a space 20 defined by the front and middle cross members 13 and 14 and floor frames 9 and 10.

The front side frames 4 and 5 extend in the fore-and-aft direction from an engine room 2 to the front floor panel 6a (not shown in FIG. 1). The side sill inners 7 and 8 are attached to the lateral outboard edges of the front and rear floor panels 6a and 6b (not shown in FIG. 1), respectively, and form a part of the cabin floor. The floor frames 9 and 10 are attached to the rear ends of the front side frames 4 and 5, respectively, and to the lower surface of the rear floor panel 6b. The outriggers 11 and 12 each consist of a laterally extending closed cross section member, and connect the front side frames 4 and 5 and the front ends of the corresponding side sill inners 7 and 8.

The front cross member 13 is connected to the inboard edges of the rear end portions of the right and left front side frames 4, 5, and is given with an arched shape defined by a concave front edge 13a and a substantially straight rear edge 13b. As a result, the fore-and-aft dimension of the front cross member 13 is made progressively smaller from each lateral end toward the middle portion thereof. The middle cross member 14 is located some distance behind the front cross member 13, and is connected to the side sill inners 7 and 8 at either lateral end thereof and to the rear ends of the floor frames 9 and 10 at intermediate points thereof.

The floor tunnel frame 15 has a rear end connected to a laterally central part of the middle cross member 14 and a front end connected to the dashboard lower tunnel frame 16 which is in turn connected to the laterally middle part of the front cross member 13 so that the two tunnel frames 15 and 16 jointly connect the laterally middle parts of the front cross member 13 and middle cross member 14 to each other.

More specifically, the rear end of the floor tunnel frame 15 is attached to the upper surface of the laterally middle part of the middle cross member 14, and the front end of the floor tunnel frame 15 is attached to the upper surface of the rear end of the dashboard lower tunnel frame 16. The dashboard lower tunnel frame 16 is attached to the upper surface of the front cross member 13, and extends forward beyond the front cross member 13, the front part of the dashboard lower tunnel frame 16 (which may be made of a separate member spot welded to the main part of the dashboard lower tunnel frame 16) extending upward along the dashboard lower panel 3. The forward and lower surface of the dashboard lower tunnel frame 16 is provided with flange shaped extensions having large areas, and attached to the dashboard lower panel 3 so that the load acting on the dashboard lower panel 3 can be favorably transmitted to the dashboard lower tunnel frame 16.

As shown in FIG. 3, the front cross member 13 is provided with a rectangular channel shaped cross section and an open side facing upward, and is connected to the dashboard lower tunnel frame 16 via the front floor panel 6a in a front part thereof and via the rear floor panel 6b in a rear part thereof. Thus, the front cross member 13 is provided with a bottom wall and a pair of upright walls 13c and 13d extending vertically from front and rear edges of the bottom wall. Meanwhile, the dashboard lower tunnel frame 16 is also provided with a rectangular channel shaped cross section that includes a pair of upright walls and a top wall, and has an open side facing downward (see FIG. 1).

Figure 4:
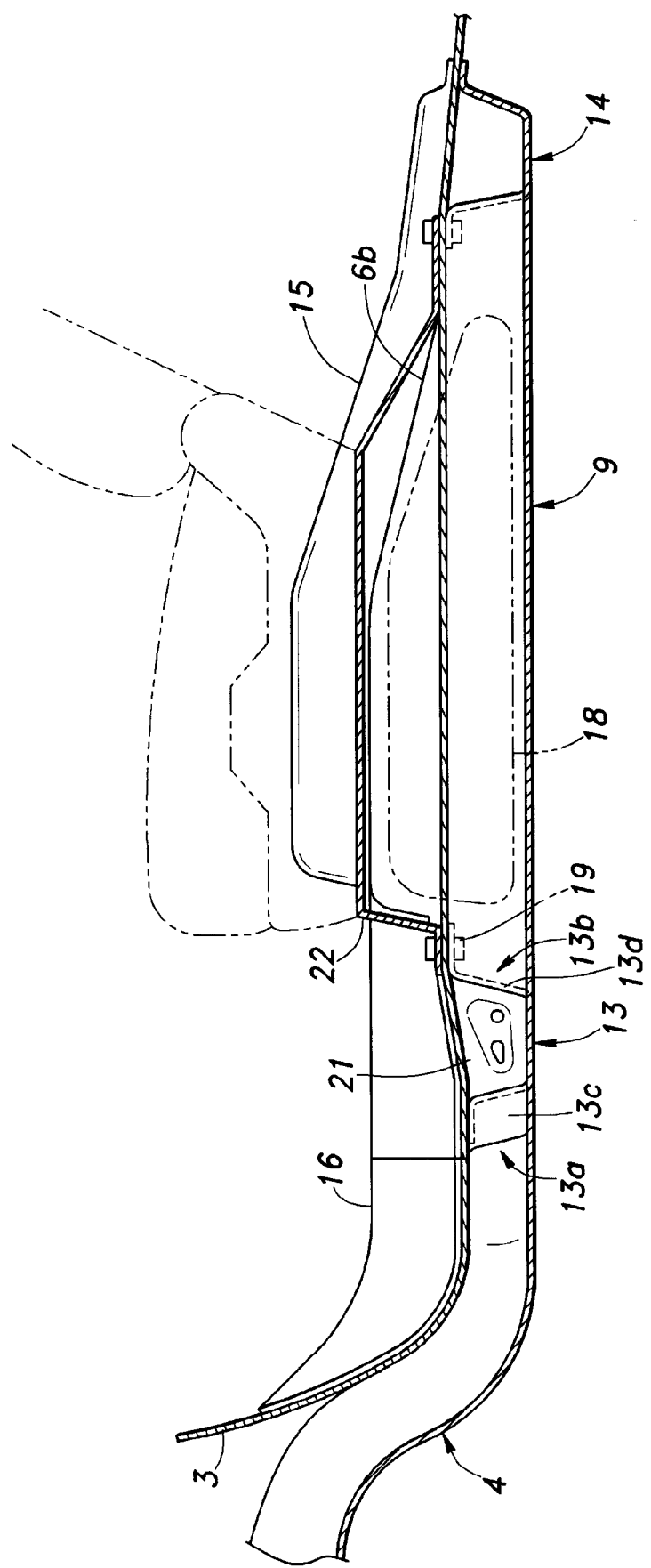
FIG. 4 is a sectional view taken along line IV-IV of FIG. 2.

As shown in FIGS. 3 and 4, the front cross member 13 is further provided with a pair of horizontal flanges extending forward from an upper end of the front upright wall 13c thereof and rearward from an upper end of the rear upright wall 13d thereof, respectively, and the front end of a seat frame 22 is attached to the rearwardly extending flange via the front end of the rear floor panel 6b. More specifically, the seat frame 22 is secured by using a threaded bolts that are threaded into nuts 19 that are welded to the lower surface of the rearwardly extending flange of the front cross member 13.

A pair of planar stiffener members 21 extending vertically and in the fore-and-aft direction are each attached to the front upright wall 13c and rear upright wall 13d of the front cross member 13 via a flange of the stiffener member 21 substantially in a laterally middle part of the front cross member 13. The planar stiffener members 21 are disposed symmetric to each other about a central longitudinal line of the vehicle body, and is spaced from each other by a distance smaller than the distance between the two upright walls of the corresponding part of the dashboard lower tunnel frame 16. In the illustrated embodiment, the stiffeners 21 are disposed immediately below and adjacent to the corresponding vertical walls of the front tunnel frame 16. Each planar stiffener member 21 includes a flange extending laterally from an upper end thereof, and this flange includes a pair of extensions that are laid over the forward and rearward extending flanges of the front cross member 13 although not shown in the drawings.

Figure 5:
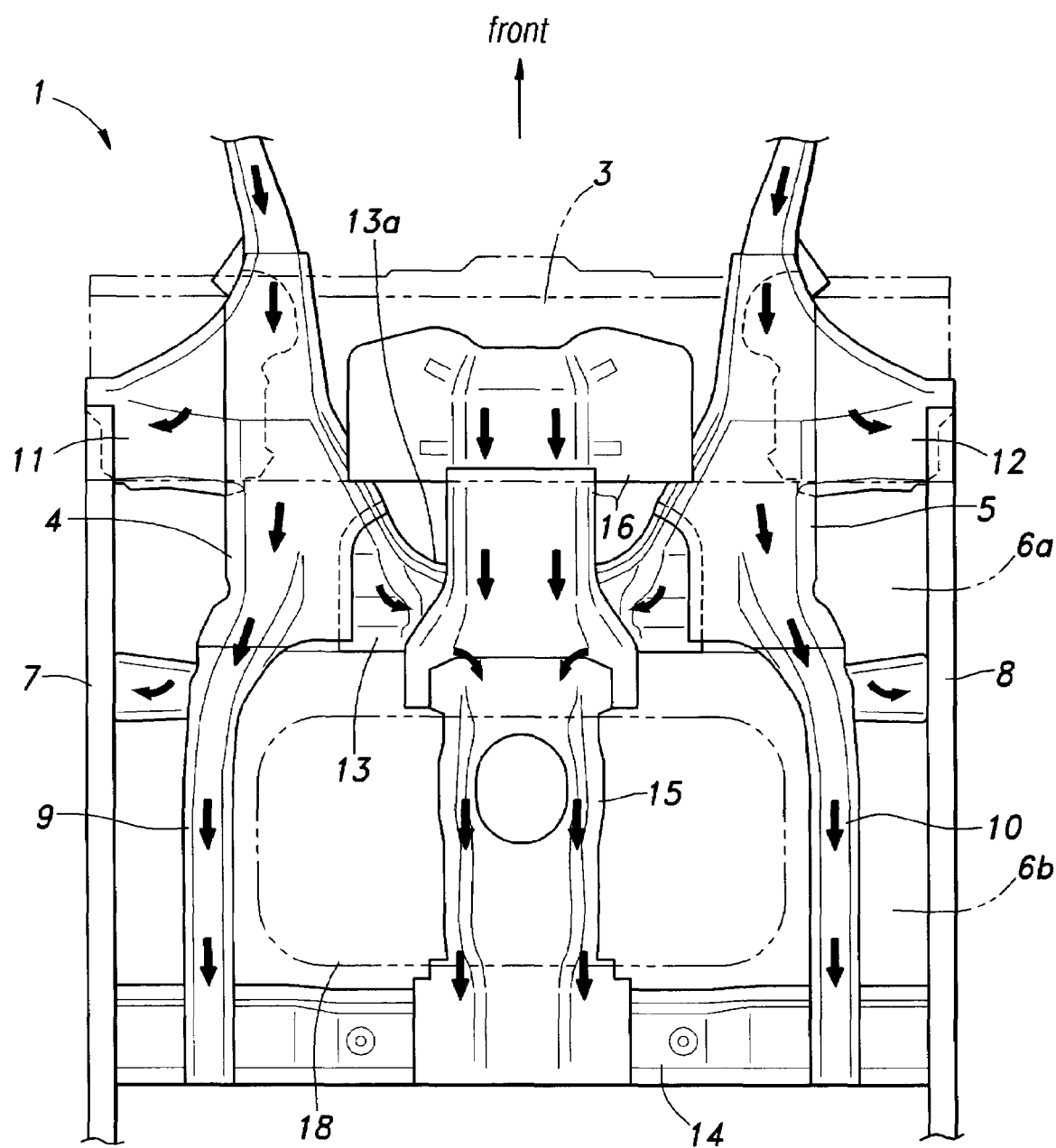
FIG. 5 is a view similar to FIG. 2 showing the paths along which the impact load is transmitted to various parts of the vehicle body.

Suppose that the front end of the vehicle body 1, which may be either traveling or stationary, has collided with a vehicle or a fixed object (or a frontal crash has occurred). As indicated by the bold arrows in FIG. 5, the impact load transmitted from the bumper beam 17 and the front side frames 4 and 5 is partly transmitted to the side sill inners 7 and 8 via the outriggers 11 and 12, respectively, but is mostly transmitted to the floor tunnel frame 15 via the front cross member 13 as well as to the floor frames 9 and 10 which are directly connected to the rear ends of the front side frames 4 and 5. In this conjunction, the floor tunnel frame 15 is laterally offset relative to the front side frames 4 and 5, but owing to the high rigidity of the front cross member 13 having the arch shape, the impact load is effectively transmitted to the floor tunnel frame 15.

When the vehicle moves obliquely with respect to the normal traveling direction owing to skidding or the like, and collides with another vehicle or a fixed object at an obliquely angle (oblique crash), the resulting impact mainly acts upon only one of the front side frames 4 and 5. Even in such a case, the impact load is effectively transmitted to the front cross member 13 so that the impact load is distributed not only to the floor tunnel frame 15 but also to the floor frame 9 or 10 located on the side opposite from the side on which the oblique impact is applied.

Owing to the channel shaped cross section of the floor tunnel frame 15, the impact load transmitted to the floor tunnel frame 15 is effectively transmitted to the middle cross member 14 primarily along the upper and/or ridge line thereof without undergoing a buckling deformation. In the illustrated embodiment, the floor tunnel frame 15 is provided with a channel shaped cross section with an open side facing downward, and the lower ends of the upright walls of the floor tunnel member 15 are each provided with a flange extending in the outboard direction (a hat shaped cross section) so that the floor tunnel frame 15 is provided with four ridge lines extending in the fore-and-aft direction.

When a frontal crash occurs to a vehicle traveling at a high speed, the engine room 2 may collapse to such an extent that the engine may be pushed into the vehicle cabin. According to the illustrated embodiment, even in such an event, the load of the engine moving rearward (or the inertia force of the vehicle body) is favorably transmitted to the front cross member 13 and floor tunnel frame 15 via the dashboard lower panel 3 and dashboard lower tunnel frame 16. Therefore, even if the engine is pushed into the dashboard lower panel 3 because of a severe frontal crash, the cabin space can be kept undeformed, and the safety of the vehicle occupant can be enhanced. Similarly to the floor tunnel frame 15, because of the channel shaped cross section of the dashboard lower tunnel member 16, the dashboard lower tunnel member 16 is enabled to transmit an impact load without buckling.

Because the stiffener members 21 are provided immediately below and/or adjacent to the lower ridge lines of the dashboard lower tunnel frame 16, the deformation of the front cross member 13 can be minimized when the front cross member 13 is subjected to a large load.

Also, not only at the time of a frontal crash but also at the time of a side impact (caused by a collision of a vehicle onto a side of the vehicle body 1), the fuel tank 18 which is received in a reinforced space 20 defined by the front and middle cross members 13 and 14 and floor frames 9 and 10 is protected from deformation and damages, and this enhances the safety of the vehicle. In the case of a battery-powered vehicle (which may also be a hybrid vehicle) or a fuel cell powered vehicle, the protected space 20 may be used for receiving batteries or fuel cells, instead of a fuel tank, to afford an improved protection.

At the time of a frontal crash, the vehicle occupant restrained by a seat belt is thrown forward by an inertia force, and this causes a significant downward force to be applied to the front part of the seat. However, in the illustrated embodiment, the front cross member 13 is given with a channel shaped cross section, and the welded nuts 19 for fastening the seat frame 22 (or the seat) are attached to the lower surface of the flange of the front cross member 13. As a result, the seat frame 22 is made resistant to deformation, and the forward pitching over of the vehicle occupant is minimized so that the head of the vehicle occupant is prevented from being brought undesirably close to the dashboard.

According to the illustrated embodiment, owing to the structure thereof described above, the floor frames 9 and 10 and front cross member 13 may be made of relatively thin and light-weight steel sheets while ensuring an adequate mechanical strength and rigidity so that the weight of the vehicle body can be reduced, and the NVH (noise, vibration and harshness) performance can be improved. Because the floor panel may consist of two separate pieces, the front floor panel 6a and rear floor panel 6b, that are separated by the front cross member 13, the thickness and/or material (using high-tension steel as opposed to normal steel) of the front part may be made different from those of the rear part so that the stamp forming efficiency or other fabrication efficiency may be improved. Also, because the front cross member 13, front tunnel frame and dashboard lower tunnel frame 16 provide an adequate mechanical strength and rigidity to the front part of the cabin, the mechanical strength of the vehicle body against a front crash and a side impact can be improved while reducing the weight of the vehicle body.

Although the present invention has been described in terms of preferred embodiments thereof, it is obvious to a person skilled in the art that various alterations and modifications are possible without departing from the scope of the present invention which is set forth in the appended claims. For instance, although the forgoing embodiment was directed to a four-door sedan, the present invention can be applied to other forms of vehicles such as two-door passenger vehicles. Also, the specific shapes of the floor frames, front cross member, middle cross member, first and second tunnel frames and floor panels as well as how they are joined to one another may be modified without departing from the spirit of the present invention.

The contents of the original Japanese patent application on which the Paris Convention priority claim is made for the present application are incorporated in this application by reference.

The invention claimed is:

1. A vehicle body structure, comprising:
 a pair of front side frames extending in a fore-and-aft direction in a mutually spaced relationship in a front part of a vehicle body;

a pair of floor frames having forward ends joined to rear ends of the corresponding front side frames, respectively, and extending in the fore-and-aft direction;

a first cross member joined to rear ends of the front side frames at either lateral end thereof;

a second cross member placed behind the first cross member and joined to the floor frames; and a first tunnel frame connected to the first and second cross members;

wherein the first cross member is provided with an arch shape such that a fore-and-aft dimension of the first cross member diminishes from each side end thereof toward a middle part thereof; and, wherein the first cross member is provided with a channel shaped cross section with an open side facing upward so as to include a bottom wall and a pair of upright walls, and a stiffener extends vertically and in a fore-and-aft direction between the two vertical walls.

2. The vehicle body structure according to claim 1, further comprising:

a floor panel defining a floor of a vehicle cabin;

a pair of side sills joined to either side edge of the floor panel; and a pair of outriggers each extending laterally between the corresponding front side frame and a front end of the side sill on the corresponding side.

3. The vehicle body structure according to claim 2, further comprising:

a dashboard lower panel disposed in front of the first cross member to separate a vehicle cabin from an engine room; and a second tunnel frame extending in a fore-and-aft direction in a laterally middle part of the vehicle body to connect the dashboard lower panel with the first cross member.

4. The vehicle body structure according to claim 3, wherein at least one of the first and second tunnel frames is provided with a channel shaped cross section with an open side facing downward.

5. The vehicle body structure according to claim 3, wherein the second tunnel frame is provided with a channel shaped cross section that includes a pair of upright walls, an open side of the second tunnel frame facing downward, and the stiffener is disposed adjacent to one of the vertical walls of the second tunnel frame.

6. The vehicle body structure according to claim 2, wherein each outrigger is provided with a rearwardly swept back front edge that extends from the corresponding front side frame to the front end of the corresponding side sill.

7. The vehicle body structure according to claim 1, further comprising a seat frame having a front end attached to the first cross member.

8. The vehicle body structure according to claim 3, further comprising a fuel tank received in a rectangular space defined by the first and second cross members and floor frames.

9. The vehicle body structure according to claim 1, wherein the front side frames are provided with oblique inboard edges which are progressively closer to each other toward rear ends thereof, and a front edge of the first cross member defines a concave shape that smoothly connects the oblique inboard edges of the front side frames.

10. The vehicle body structure according to claim 9, wherein the first cross member is provided with a substantially straight rear edge.

11. The vehicle body structure according to claim 1, wherein the floor panel comprises a front part and a rear part that are joined to each at the first cross member.

* * * * *